United States Patent
Chiu

(10) Patent No.: US 12,493,637 B2
(45) Date of Patent: *Dec. 9, 2025

(54) ACTIVE CHATBOT SYSTEM WITH BEHAVIORAL AWARENESS AND ON-DEMAND CONVERSATION AND METHOD THEREOF

(71) Applicants: SQ Technology (Shanghai) Corporation, Shanghai (CN); Inventec Corporation, Taipei (TW)

(72) Inventor: Chuan-Cheng Chiu, Taipei (TW)

(73) Assignees: SQ Technology (Shanghai) Corporation, Shanghai (CN); Inventec Corporation, Taipei (TW)

( * ) Notice: Subject to any disclaimer, the term of this patent is extended or adjusted under 35 U.S.C. 154(b) by 210 days.

This patent is subject to a terminal disclaimer.

(21) Appl. No.: 18/461,183

(22) Filed: Sep. 5, 2023

(65) Prior Publication Data

US 2024/0427809 A1    Dec. 26, 2024

(30) Foreign Application Priority Data

Jun. 25, 2023  (CN) .......................... 202310752910.4

(51) Int. Cl.
| | | |
|---|---|---|
| G06F 16/3329 | (2025.01) | |
| G06F 9/448 | (2018.01) | |
| G06F 40/205 | (2020.01) | |
| G06F 40/279 | (2020.01) | |
| G06V 40/10 | (2022.01) | |
| G06V 40/16 | (2022.01) | |

(Continued)

(52) U.S. Cl.
CPC ........ G06F 16/3329 (2019.01); G06F 9/4498 (2018.02); G06F 40/205 (2020.01); G06F 40/279 (2020.01); G06V 40/15 (2022.01); G06V 40/174 (2022.01); G06V 40/20 (2022.01); H04L 51/02 (2013.01)

(58) Field of Classification Search
CPC .. G06F 16/3329; G06F 9/4498; G06F 40/279; G06F 40/205; G06V 40/174; G06V 40/15; G06V 40/20; H04L 51/02
See application file for complete search history.

(56) References Cited

U.S. PATENT DOCUMENTS 11,567,788 B1 *   1/2023   Khemka .............. G06Q 10/109

* cited by examiner

*Primary Examiner* — Sonia L Gay
(74) *Attorney, Agent, or Firm* — David R. Stevens; Stevens Law Group

(57) ABSTRACT

An active chatbot system with behavioral awareness and on-demand conversation and a method thereof are disclosed. In the active chatbot system, a client-end host continuously senses a client behavior state, and transmits the sensed client behavior state and an on-demand conversation setting to a server-end host to generate a rough question message having a natural language structure, and input the rough question message to a plurality of finite state machines to generate a precise question message. The server-end host transmits the precise question message to an artificial intelligence platform to obtain a corresponding answer message, stores the answer message to an answer list, filters out an answer message matching the on-demand conversation setting as an on-demand conversation message, transmits the on-demand conversation message to the client-end host for output. Therefore, the technical effect of improving human-computer interaction and initiative of chatbot can be achieved.

10 Claims, 6 Drawing Sheets

(51) Int. Cl.
*G06V 40/20* (2022.01)
*H04L 51/02* (2022.01)

500

| "Come on, record your current excitement as soon as possible" |
| "Share your excitement with the world, it's never too late" |
| "I can't wait to look forward to a delicious lunch" |
| ⋮ |

510

Chatbot: "Come on, record your current excitement as soon as possible"

Chatbot: "I can't wait to look forward to a delicious lunch"

FIG. 5

ACTIVE CHATBOT SYSTEM WITH BEHAVIORAL AWARENESS AND ON-DEMAND CONVERSATION AND METHOD THEREOF

CROSS-REFERENCE TO RELATED APPLICATION

This application claims the benefit of Chinese Application Serial No. 202310752910.4, filed Jun. 25, 2023, which is hereby incorporated herein by reference in its entirety.

BACKGROUND OF THE INVENTION

1. Field of the Invention

The present invention relates to a chatbot system and a method thereof, and more particularly to an active chatbot system with behavioral awareness and on-demand conversation, and a method thereof.

2. Description of the Related Art

In recent years, with the popularization and vigorous development of artificial intelligence (AI), various AI applications have sprung. Among the AI applications, chatbot attracts the most attention.

Generally speaking, the conventional chatbot uses a passive chat mode for man-machine dialogue, that is, when the user sends a question, the conventional chatbot replies an answer according to the question; if the user does not ask a question, the conventional chatbot does not make any response; at most, the conventional chatbot actively replies to the welcome message or guidance message at the initial stage, so there is a problem that the conventional chatbot is unable to actively provide human-computer interaction chat.

For the above-mentioned reason, some manufacturers proposed to use the user's browsing records as a technical means of active question, for example, when the user browses a webpage for an item, the conventional chatbot can actively ask whether you want to buy this item or introduce this item in detail. Although this method can actively reply messages, its interactive manner is rigid and not humanized, and cannot be called chatting. The above-mentioned conventional chatbot still cannot effectively solve the problem of failing to actively provide human-computer interactive chatting.

Therefore, what is needed is to develop an improved solution to solve the problem of failing to actively provide human-computer interactive chatting.

SUMMARY OF THE INVENTION

An objective of the present invention is to disclose an active chatbot system with behavioral awareness and on-demand conversation and a method thereof, to solve the conventional problem.

In order to achieve the objective, the present invention provides an active chatbot system with behavioral awareness and on-demand conversation, includes an artificial intelligence platform, a client-end host, and a server-end host. The artificial intelligence platform is configured to receive a precise question message through an application programming interface (API) and input the precise question message to a large language model to generate an answer message, and transmit the answer message through the application programming interface. The client-end host includes at least one sensor, a first non-transitory computer readable storage medium, and a first hardware processor. The at least one sensor is configured to continuously sense at least one of a physiological state, a facial expression and a body movement, to generate a client behavior state. The first non-transitory computer readable storage medium is configured to store a plurality of first computer readable instructions. The first hardware processor is electrically connected to the first non-transitory computer readable storage medium and the at least one sensor, and configured to execute the plurality of first computer readable instructions to make the client-end host continuously transmit the client behavior state and on-demand conversation setting, wherein the on-demand conversation setting includes a time message and a filtering parameter. The server-end host, connected to the client-end host and configured to receive the client behavior state and the on-demand conversation setting, and the server-end host includes a finite state machine controller, a second non-transitory computer readable storage medium, and a second hardware processor. The finite state machine controller is configured to integrate a plurality of finite state machines (FSMs). The second non-transitory computer readable storage medium is configured to store a plurality of second computer readable instructions. The second hardware processor is electrically connected to the second non-transitory computer readable storage medium and the finite state machine controller, and configured to execute the plurality of second computer readable instructions to make the server-end host execute: generating a rough question message having a natural language structure based on the received client behavior state and on-demand conversation setting; inputting the rough question message to make the plurality of finite state machines to perform parsing and transit states of the plurality of finite state machines, to generate and transmit the precise question message to the artificial intelligence platform; receiving the answer message corresponding to the precise question message from the artificial intelligence platform, and storing the answer message to an answer list; automatically filtering out the answer message matching the time message and the filtering parameter from the answer list as the on-demand conversation message generated based on the on-demand conversation setting, and transmitting the on-demand conversation message to the client-end host for output.

In order to achieve the objective, the present invention discloses an active chatbot method with behavioral awareness and on-demand conversation, and the active chatbot method includes steps of: connecting a server-end host to an artificial intelligence platform and a client-end host; continuously sensing at least one of a physiological state, a facial expression and a body movement to generate a client behavior state through a sensor, by the client-end host; continuously transmitting the client behavior state and on-demand conversation setting to the server-end host, by the client-end host, wherein the on-demand conversation setting comprises a time message and a filtering parameter; generating a rough question message having a natural language structure based on the received client behavior state and on-demand conversation setting, and inputting the rough question message to a plurality of finite state machines to perform parsing, and transiting states of the plurality of finite state machines to generate a precise question message, by the server-end host; transmitting the precise question message to the artificial intelligence platform through an application programming interface (API) of the artificial intelligence platform, by the server-end host; inputting the precise question message to the large language model to generate an answer message, and transmitting the answer message to the server-end host through the application programming interface, by the artificial intelligence platform; receiving the answer message corresponding to the precise question message from the artificial intelligence platform, and storing the answer message to an answer list, automatically filtering out the answer message matching the time message and the filtering parameter as an on-demand conversation message from the answer list, and transmitting the on-demand conversation message to the client-end host for output, by the server-end host.

According to the above-mentioned system and method of the present invention, the difference between the conventional technology and the present invention is that in the present invention the client-end host continuously senses the client behavior state, and transmits the sensed client behavior state and the on-demand conversation setting to the server-end host to generate the rough question message having the natural language structure, and input the rough question message to the plurality of finite state machines to generate the precise question message; the server-end host transmits the precise question message to the artificial intelligence platform to obtain the corresponding answer message, stores the answer message to the answer list, filters out the answer message matching the on-demand conversation setting as the on-demand conversation message, and transmits the on-demand conversation message to the client-end host for output.

Therefore, the technical solution of the present invention is able to achieve the technical effect of improving human-computer interaction and initiative of chatbot.

BRIEF DESCRIPTION OF THE DRAWINGS

The structure, operating principle and effects of the present invention will be described in detail by way of various embodiments which are illustrated in the accompanying drawings.

FIG. 5 is a schematic view showing an operation of actively filtering out an answer message from an answer list, according to the present invention.

DETAILED DESCRIPTION OF THE PREFERRED EMBODIMENTS

Figure 1:
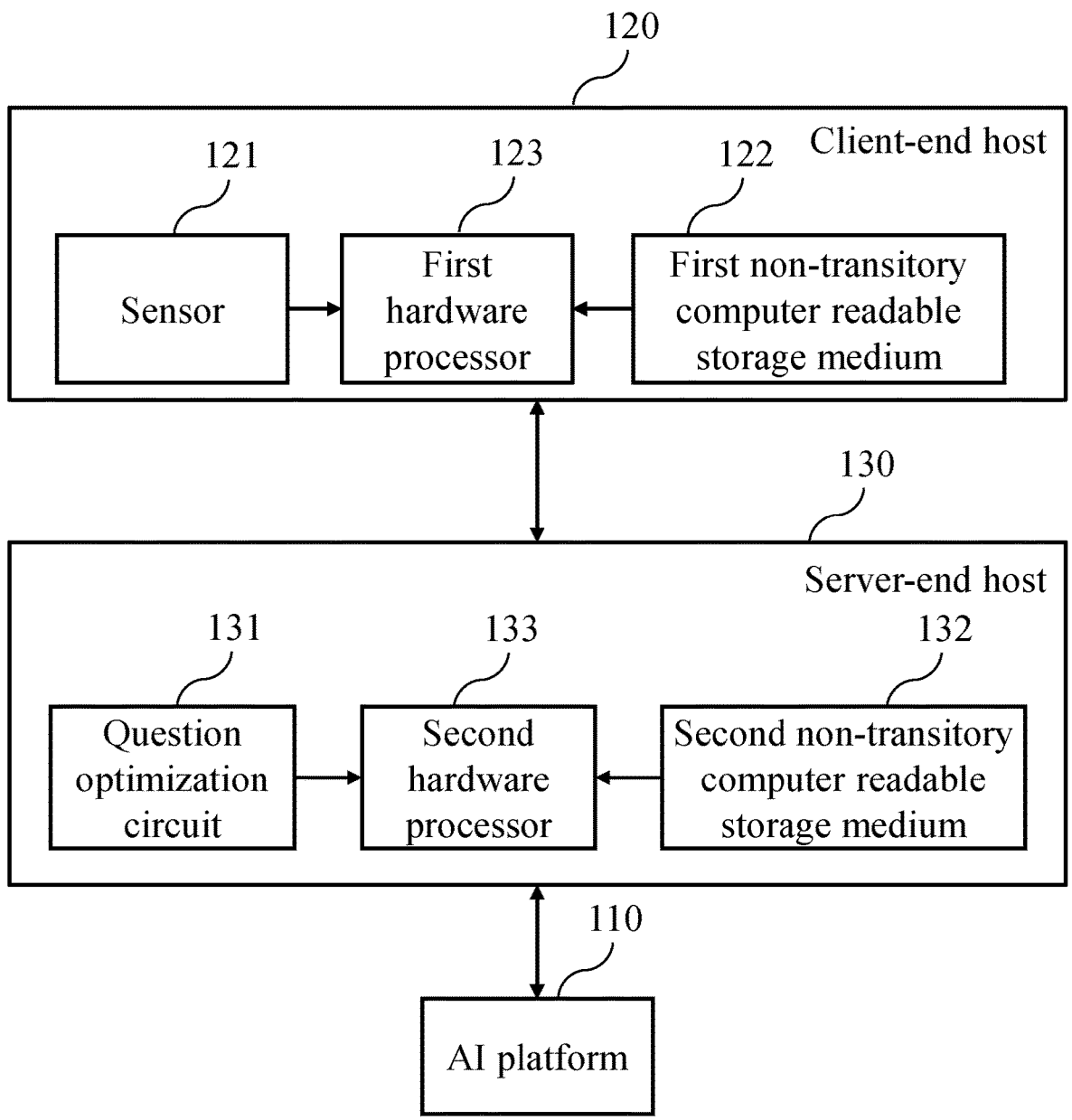
FIG. 1 is a block diagram of an active chatbot system with behavioral awareness and on-demand conversation, according to the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

Please refer to FIG. 1, which is a block diagram of an active chatbot system with behavioral awareness and on-demand conversation, according to the present invention. As shown in FIG. 1, the active chatbot system includes an artificial intelligence platform 110, a client-end host 120, and a server-end host 130. The artificial intelligence platform 110 is configured to receive a precise question message through an application programming interface (API), and input the precise question message to a large language model to generate an answer message, and transmit the answer message to the server-end host 130 through the application programming interface. In actual implementation, the artificial intelligence platform 110 uses a chatbot using a large language model, the large language model can be, for example, generative pre-trained transformer, (GPT), paLM, Galactica, LLAMA, LaMDA or the like.

The client-end host 120 includes a sensor 121, a first non-transitory computer readable storage medium 122, and a first hardware processor 123. The sensor 121 is configured to continuously sense at least one of a physiological state, a facial expression and a body movement, to generate a client behavior state. In actual implementation, the sensor 121 senses physiological feature such as blood pressure, heartbeat, pulse, blood sugar, to determine the physiological state such as, happy, excited, or depressed; in an embodiment, the sensor 121 is used to determine a facial expression and mood by sensing human face and iris; in an embodiment, a sensor (such as a three-axis acceleration sensor or a gyroscope) worn on the limbs of the human body can be used to sense the user's body movement, such as walking, running, dancing and so on.

The first non-transitory computer readable storage medium 122 is configured to store a plurality of first computer readable instructions. In actual implementation, the first non-transitory computer readable storage medium 122 includes a hard disk, an optical disk, a flash memory or the like. In addition, the first computer readable instruction means an instruction which can be interpreted and executed by the client-end host 120, such as a computer in client-end device.

The first hardware processor 123 is electrically connected to the first non-transitory computer readable storage medium 122 and the sensor 121, and configured to execute the plurality of first computer readable instructions to make the client-end host 120 continuously transmit the client behavior state and multiple on-demand conversation settings. The on-demand conversation setting includes a time message and a filtering parameter. The time message can include, for example, year, month, day, hours, minutes, seconds, and even time intervals, and can be used as a basis of determining the answer message associated with time, for example, the time message can be used for determining whether the answer message is expired, setting periodic feedback (for example, sending an on-demand conversation message reminding you to eat at 12 am every day), or other time-related situations; for example, the time in the morning is associated with breakfast, the period from 0:00 am to 4:00 am is associated with sleep, and national holidays are associated with fixed dates, a birthday is associated with a specified date, etc. Therefore, when the time falls within the morning scope, the answer message related to breakfast is filtered out; when the time falls between 0:00 am and 4:00 am, the answer message related to sleep is filter out; when the time is a national holiday, the answer message containing this national holiday is filtered out. In addition, the filtering parameter can be used, for example, to set the answer message which is permitted to receive, and the answer message which is rejected to receive; in other words, the user can be set the filtering parameter according to his preference, for example, filtering parameter can be set to filter out chat content containing politics and religion, or only receive entertainment chat content.

The server-end host 130 is connected to the client-end host 120 and configured to receive the client behavior state and the on-demand conversation setting. The server-end host 130 includes a finite state machine controller 131, a second non-transitory computer readable storage medium 132, and a second hardware processor 133. The finite state machine controller 131 integrates multiple finite state machines, for example, the finite state machines include a Mealy-machine finite state machine and a Moore-machine finite state machine, and the finite state machine controller 131 selects and uses at least one of the Mealy-machine finite state machine and the Moore-machine finite state machine to generate a precise question message, which is more precise than the rough question message, according to different requirement of the on-demand conversation setting. In practice, each on-demand conversation setting can be transited into a state table first, a flip-flop transition table is then set based on a flip-flop excitation table, and the Karnaugh map can be used to obtain input equations of each flip-flop, so as to generate the circuit of the finite state machine, and the circuit is packaged into an integrated circuit (IC) to realize the finite state machine controller 131.

The second non-transitory computer readable storage medium 132 is configured to store a plurality of second computer readable instructions. In actual implementation, the second non-transitory computer readable storage medium 132 is similar to the first non-transitory computer readable storage medium 122, and the difference between the second non-transitory computer readable storage medium 132 and the first non-transitory computer readable storage medium 122 is that the second non-transitory computer readable storage medium 132 is a non-transitory computer readable storage medium of the server-end host 130 for storing the computer readable instruction (that is, second computer readable instruction) executed by the server-end host 130, and the first non-transitory computer readable storage medium 122 is the non-transitory computer readable storage medium of the client-end host 120 for storing the computer readable instruction (that is, the first computer readable instruction) executed by the client-end host 120.

The second hardware processor 133 is electrically connected to the second non-transitory computer readable storage medium 132 and the finite state machine controller 131, and configured to execute the plurality of second computer readable instructions to make the server-end host 130 execute: generating a rough question message having a natural language structure based on the received client behavior state and on-demand conversation setting; inputting the rough question message to make the finite state machine perform parsing and transiting a state of the finite state machine to generate and transmit the precise question message to the artificial intelligence platform 110; receiving the answer message corresponding to the precise question message from the artificial intelligence platform 110, and storing the answer message to an answer list; automatically filtering out the answer message matching the time message and the filtering parameter from the answer list as the on-demand conversation message generated based on the on-demand conversation setting, and transmitting the on-demand conversation message to the client-end host 120 for output. For example, in a condition that the client behavior state received by the server-end host 130 is "exercise" and the on-demand conversation setting includes time message "AM 08:00" and the filtering parameter is "only accepting suggestions with low difficulty in implementation", the second hardware processor 133 generates the rough question message such as "exercise, AM 08:00 and low difficulty" based on the terms "exercise", "AM 08:00" and "low difficulty". Next, the rough question message is inputted to a finite state machine to perform parsing, and the state of the finite state machine is transited. For example, a type of the question is defined based on "exercise", a specific time state of the question is defined based on "AM 08:00", a scope of the question is defined based on "low difficulty", and then a precise question message is generated according to a pre-defined template or a syntax rule, for example, "please list the low-difficulty exercise that can be played at 8:00 in the morning", or "it is 8:00 in the morning, and the low-difficulty exercise, any suggestions?". Next, the precise question message is transmitted to the artificial intelligence platform 110 to obtain the corresponding answer message, the answer message is stored in an answer list, so that the second hardware processor 133 can automatically filter out the answer message matching the time message and the filtering parameter from the answer list, as the on-demand conversation message. For example, in a condition that the user's motion is regularly sensed at both 8 am and 6 μm and corresponding answer messages are obtained and stored in the answer list, when the current time is evening, the answer message related to the morning is excluded, and only the answer message related to the evening is selected as the on-demand conversation message. The second hardware processor 133 drives the transmission element to actively transmit the on-demand conversation message to the client-end host 120, for output. In other words, when receiving the client behavior state, the server-end host 130 triggers the active on-demand conversation and filters out the matching answer message as the on-demand conversation message based on the on-demand conversation setting.

It is to be particularly noted that, in actual implementation, the present invention can be implemented fully or partly based on hardware, for example, one or more module of the system can be implemented by integrated circuit chip, system on chip (SOC), a complex programmable logic device (CPLD), or a field programmable gate array (FPGA). The non-transitory computer readable storage medium of the present invention records computer readable program instructions, and the processor can execute the computer readable program instructions to implement concepts of the present invention. The non-transitory computer-readable storage medium can be a tangible apparatus for holding and storing the instructions executable of an instruction executing apparatus. The non-transitory computer-readable storage medium can be, but not limited to electronic storage apparatus, magnetic storage apparatus, optical storage apparatus, electromagnetic storage apparatus, semiconductor storage apparatus, or any appropriate combination thereof. More particularly, the computer-readable storage medium can include a hard disk, an RAM memory, a read-only-memory, a flash memory, an optical disk, a floppy disc or any appropriate combination thereof, but this exemplary list is not an exhaustive list. The non-transitory computer-readable storage medium is not interpreted as the instantaneous signal such a radio wave or other freely propagating electromagnetic wave, or electromagnetic wave propagated through waveguide, or other transmission medium (such as optical signal transmitted through fiber cable), or electric signal transmitted through electric wire. Furthermore, the computer readable program instruction can be downloaded from the non-transitory computer-readable storage medium to each calculating/processing apparatus, or downloaded through network, such as internet network, local area network, wide area network and/or wireless network, to external computer equipment or external storage apparatus. The network includes copper transmission cable, fiber transmission, wireless transmission, router, firewall, switch, hub and/or gateway. The network card or network interface of each calculating/processing apparatus can receive the computer readable program instructions from network, and forward the computer readable program instruction to store in non-transitory computer-readable storage medium of each calculating/processing apparatus. The computer program instructions for executing the operation of the present invention can include source code or object code programmed by assembly language instructions, instruction-set-structure instructions, machine instructions, machine-related instructions, micro instructions, firmware instructions or any combination of one or more programming language. The programming language include object oriented programming language, such as Common Lisp, Python, C++, Objective-C, Smalltalk, Delphi, Java, Swift, C#, Perl, Ruby, and PHP, or regular procedural programming language such as C language or similar programming language.

Figure 2A:
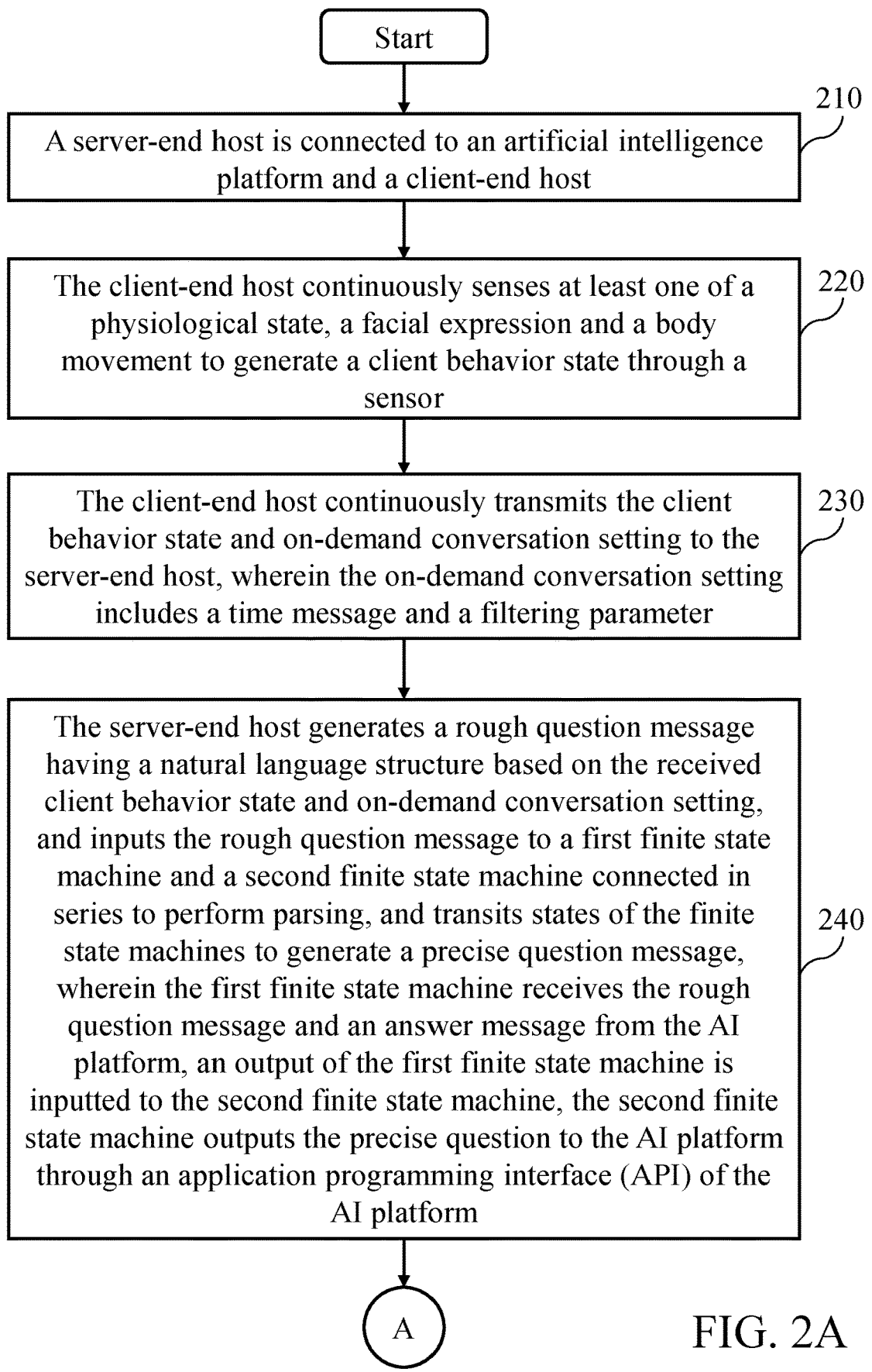
FIGS. 2A and 2B are flowcharts of an active chatbot method with behavioral awareness and on-demand conversation, according to the present invention.
Figure 2B:
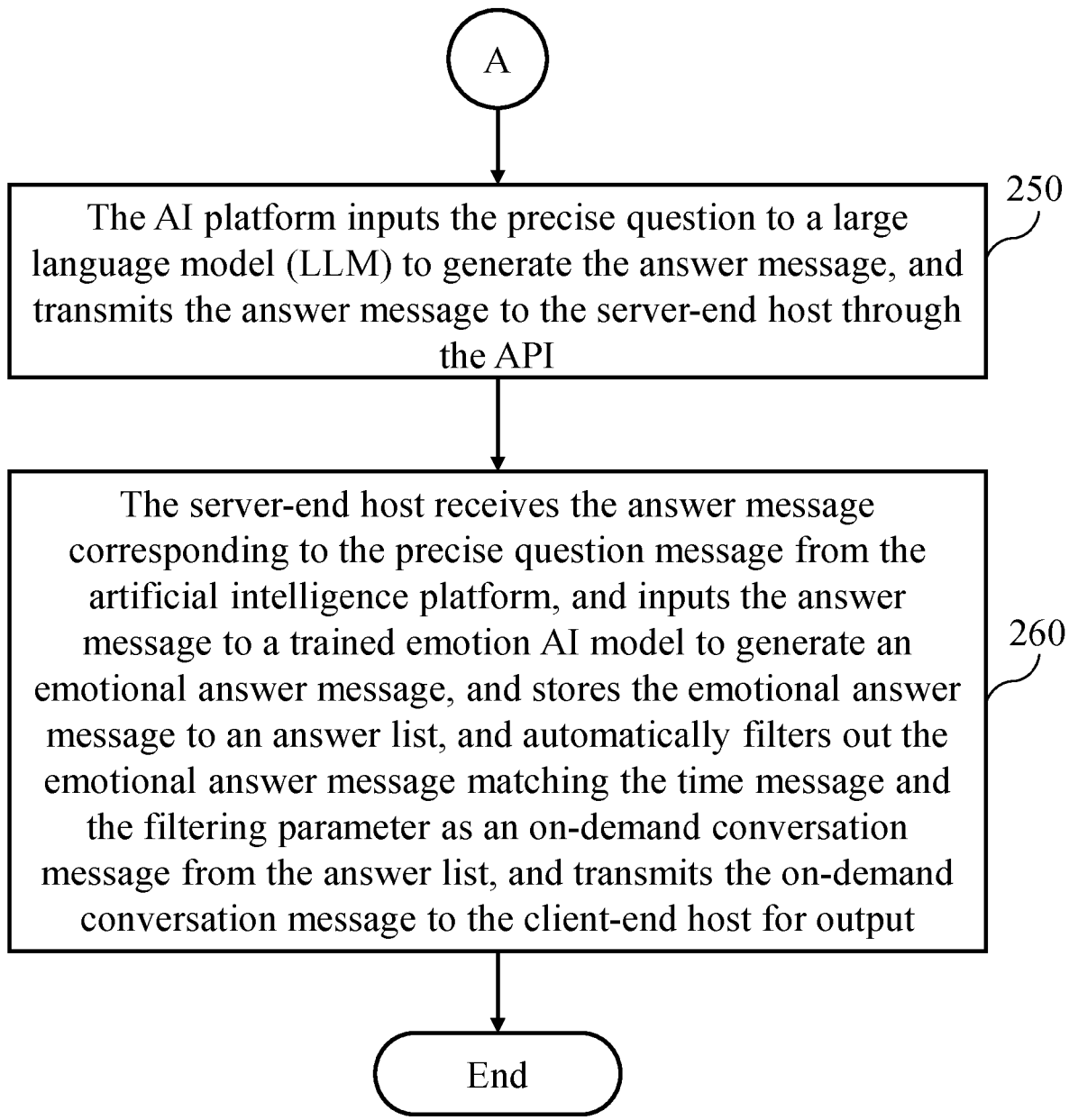

Please refer to FIG. 2A and FIG. 2B, which are flowcharts of an active chatbot method with behavioral awareness and on-demand conversation, according to the present invention. As shown in FIG. 2A and FIG. 2B, the active chatbot method includes the following steps. In a step 210, a server-end host 130 is connected to an artificial intelligence platform 110 and a client-end host 120. In a step 220, the client-end host 120 continuously senses at least one of a physiological state, a facial expression and a body movement to generate a client behavior state through a sensor 121. In a step 230, the client-end host 120 continuously transmits the client behavior state and on-demand conversation setting to the server-end host 130, wherein the on-demand conversation setting includes a time message and a filtering parameter. In a step 240, the server-end host 130 generates a rough question message having a natural language structure based on the received client behavior state and on-demand conversation setting, inputs the rough question message to a plurality of finite state machines to perform parsing, and transits states of the plurality of finite state machines to generate a precise question message. In a step 250, the server-end host 130 transmits the precise question message to the artificial intelligence platform 110 through an application programming interface (API) of the artificial intelligence platform 110. In a step 260, the artificial intelligence platform 110 inputs the precise question message to the large language model to generate an answer message, and transmits the answer message to the server-end host 130 through the application programming interface. In a step 270, the server-end host 130 receives the answer message corresponding to the precise question message from the artificial intelligence platform 110, and stores the answer message to an answer list, automatically filters out the answer message matching the time message and the filtering parameter as an on-demand conversation message from the answer list, and transmits the on-demand conversation message to the client-end host 120 for output. Through aforementioned steps, in the present invention the client-end host continuously senses the client behavior state, and transmits the sensed client behavior state and the on-demand conversation setting to the server-end host to generate the rough question message having the natural language structure, and input the rough question message to the plurality of finite state machines to generate the precise question message; the server-end host transmits the precise question message to the artificial intelligence platform to obtain the corresponding answer message, stores the answer message to the answer list, filters out the answer message matching the on-demand conversation setting as the on-demand conversation message, and transmits the on-demand conversation message to the client-end host for output.

Figure 3:
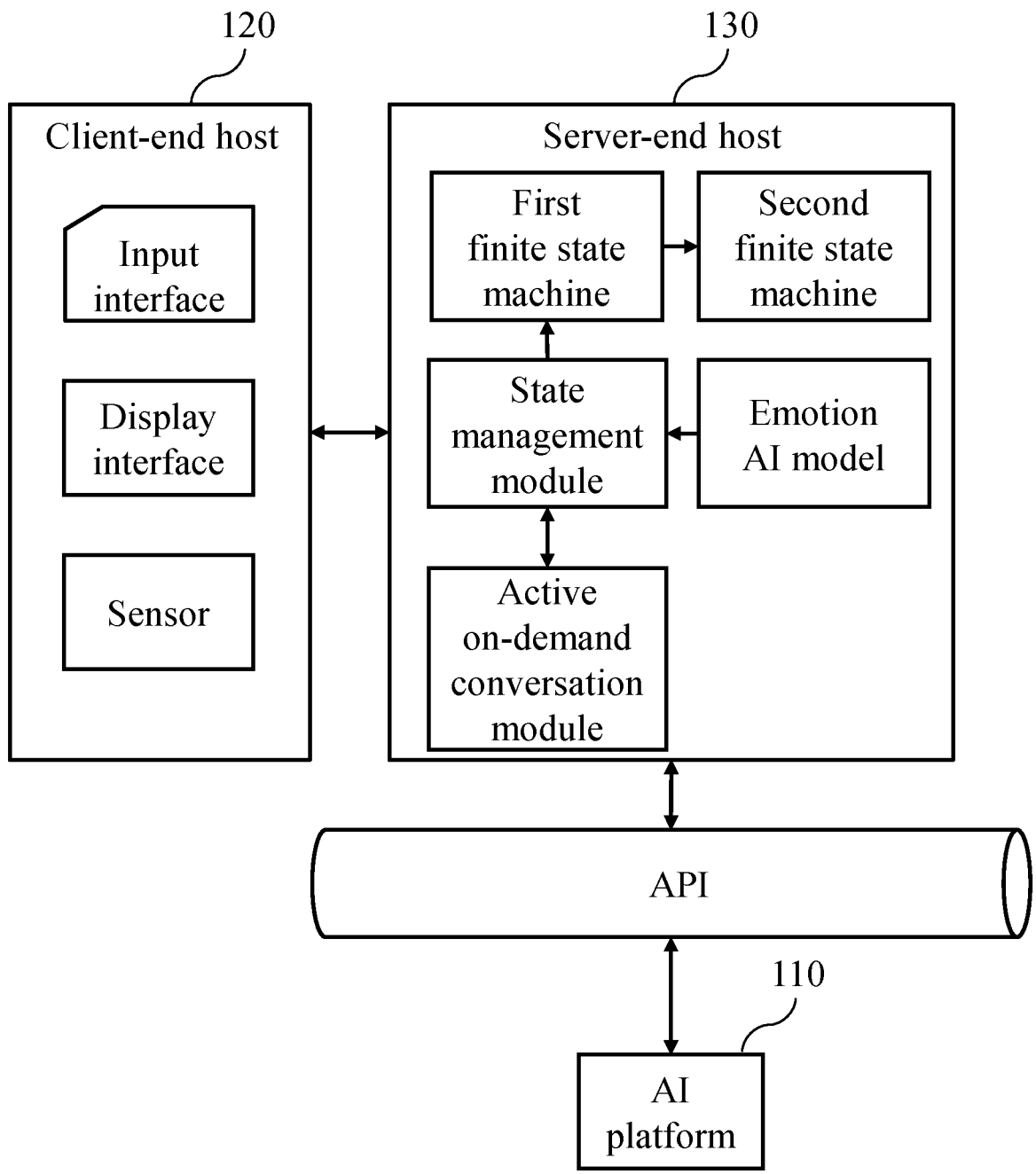
FIG. 3 is a schematic view of an active chatbot of the present invention.

The embodiment of the present invention is described in the following paragraphs with reference to FIG. 3 to FIG. 5. Please refer to FIG. 3, which is a schematic view of an active chatbot of the present invention. The server-end host 130 is connected to the artificial intelligence platform 110 and the client-end host 120. The client-end host 120 continuously senses at least one of a user's physiological state, facial expression and body movement to generate a client behavior state, and continuously transmits the client behavior state and multiple on-demand conversation settings to the server-end host 130 through an input interface, the on-demand conversation settings include a time message and a filtering parameter. A state management module of the server-end host 130 generates the rough question message having the natural language structure based on the received client behavior state and on-demand conversation setting, and inputs the generated rough question message to the finite state machine to perform parsing, and transits the state of the finite state machine, so as to generate the precise question message. Next, the precise question message is transmitted to the artificial intelligence platform 110 through the API of the artificial intelligence platform 110. The artificial intelligence platform 110 inputs the precise question message to the large language model to generate an answer message, and transmits the answer message to the server-end host 130 through the API. After the server-end host 130 receives the answer message corresponding to the precise question message from the artificial intelligence platform 110, the server-end host 130 stores the answer message to the answer list, and actively filters out the answer message matching the on-demand conversation setting (that is, the time message and the filtering parameter) as the on-demand conversation message from the answer list, transmits the filtered on-demand conversation message to the client-end host 120 for output through an display interface. Therefore, the chatbot completes the active human-machine interaction with the user by actively transmitting the on-demand conversation message according to the sensed client behavior state. Particularly, it should be noted that the state management module and the active on-demand conversation module are implemented by executing computer readable instruction by the hardware processor.

Figure 4:
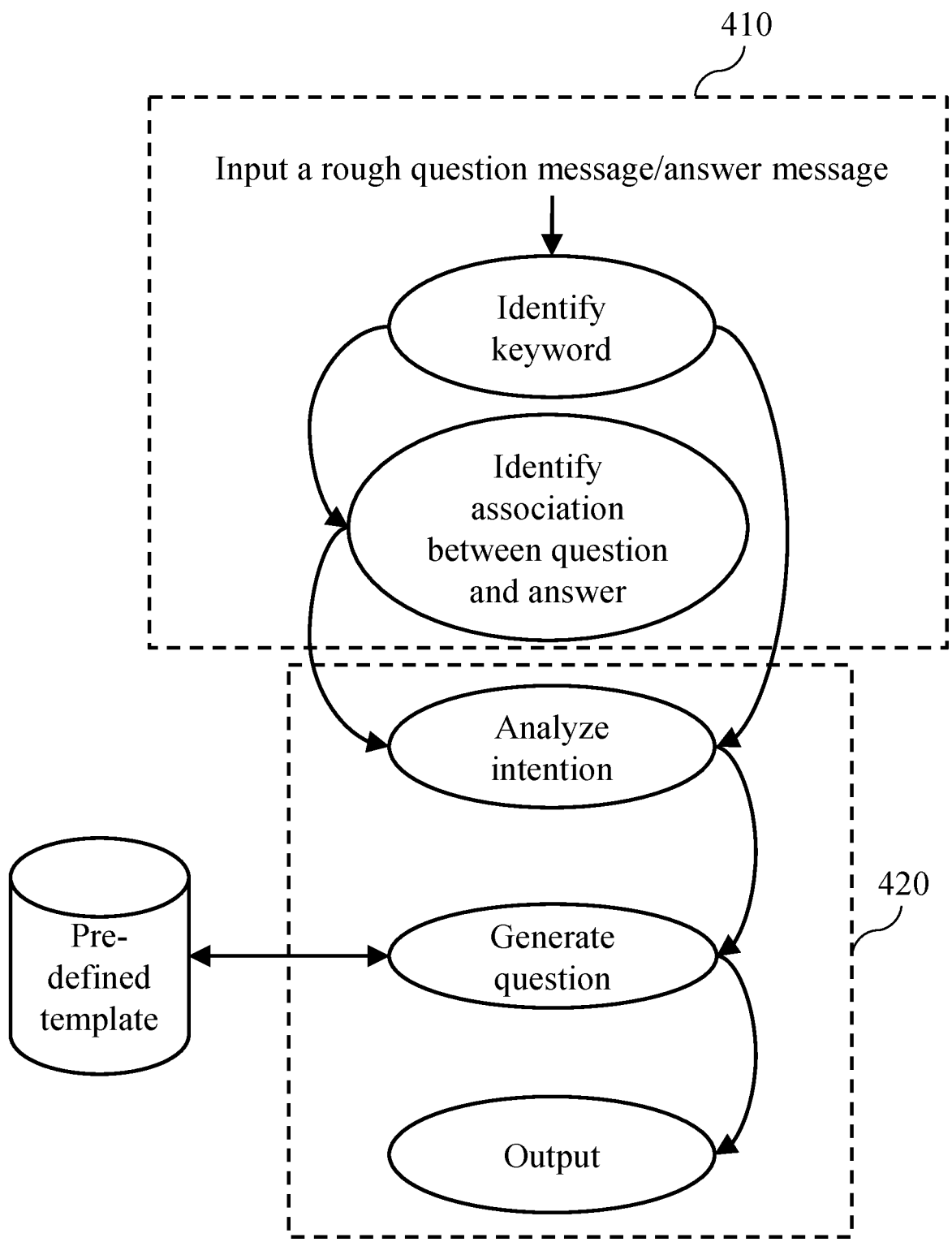
FIG. 4 is a schematic view of a finite state machine of the present invention.

As shown in FIG. 4, which is a schematic view of a finite state machine of the present invention. In actual implementation, when the rough question message is inputted to the finite state machine 400, it is determined whether the client behavior state (abbreviated as a state, such as "exercise") exists in the question according to the rough question message, whether time (such as "am 8:00") exists in the question, whether a scope (such as "low difficulty") exists in the question, and the pre-defined template suitable for application is selected to output based on the existed state, time and scope. The pre-defined template refers to the question statement template of natural language structure that has not been embedded with state, time, scope or a combination thereof, for example, the question sentence template can be "it is [time], [state] of [scope] in progress, what suggestions do you have", where the square brackets represent the types of words to be embedded, respectively. For the above example, the question sentence embedded with items is "now 8:00 in the morning, and the exercise with low difficulty is going on, what suggestions do you have", this question sentence is used as the precise question message. It should be noted that, besides including all of status, time and scope, the question sentence can also include only any one of status, time and scope, such as "I am in [status], please list the matters that need attention on this basis", "please list five a suggestion related to [status]".

As shown in FIG. 5, which is a schematic view showing an operation of actively filtering out an answer message from an answer list, according to the present invention. In a condition that there are multiple answer messages in an answer list 500, when "low difficulty" is added into the filtering parameter of the on-demand conversation setting, the server-end host 130 performs active on-demand conversation, the server-end host 130 to filter out the first answer message in the answer list 500 as the on-demand conversation message, because this answer message has a limitation in the scope of "low difficulty". In addition, in a condition that the time message of the on-demand conversation setting is set as "periodic feedback" and the time in the parameter is "12:00 noon", when it is 12:00 noon now, the server-end host 130 filters out the answer message having similar key word (such as: noon 12:00) as the on-demand conversation message. In this way, even if a client does not ask questions, the chatbot using the present invention can actively provide the on-demand conversation message to the client according to the client behavior state or regular feedback, thereby effectively improving the human-computer interaction and initiative of chatbot. It should be noted that, in actual implementation, the server-end host 130 can directly receive, from the client-end host 120, the message inputted by the user as the precise question message (such as "please list three kinds of meals suitable for eating at noon"), transmit the precise question message to the artificial intelligence platform 110 to obtain the corresponding answer message (such as "chicken steak rice, drumstick rice and hot pot") through the API, and transmit the answer message to the client-end host 120 for output through an display interface 510.

According to the above-mentioned system and method of the present invention, the difference between the present invention and the conventional technology is that in the present invention the client-end host continuously senses the client behavior state, and transmits the sensed client behavior state and the on-demand conversation setting to the server-end host to generate the rough question message having the natural language structure, and input the rough question message to the plurality of finite state machines to generate the precise question message; the server-end host transmits the precise question message to the artificial intelligence platform to obtain the corresponding answer message, stores the answer message to the answer list, filters out the answer message matching the on-demand conversation setting as the on-demand conversation message, and transmits the on-demand conversation message to the client-end host for output. Therefore, the technical solution of the present invention is able to solve the conventional problem, and achieve the technical effect of improving human-computer interaction and initiative of chatbot.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. An active chatbot system with behavioral awareness and on-demand conversation, comprising:
    an artificial intelligence platform, configured to receive a precise question message through an application programming interface (API) and input the precise question message to a large language model to generate an answer message, and transmit the answer message through the application programming interface;
    a client-end host, comprising:
        at least one sensor, configured to continuously sense at least one of a physiological state, a facial expression and a body movement, to generate a client behavior state;
        a first non-transitory computer readable storage medium, configured to store a plurality of first computer readable instructions; and
        a first hardware processor, electrically connected to the first non-transitory computer readable storage medium and the at least one sensor, and configured to execute the plurality of first computer readable instructions to make the client-end host continuously transmit the client behavior state and on-demand conversation setting, wherein the on-demand conversation setting comprises a time message and a filtering parameter; and
    a server-end host, connected to the client-end host and configured to receive the client behavior state and the on-demand conversation setting, wherein the server-end host comprises:
        a finite state machine controller, configured to integrate a plurality of finite state machines (FSMs);

a second non-transitory computer readable storage medium, configured to store a plurality of second computer readable instructions; and a second hardware processor, electrically connected to the second non-transitory computer readable storage medium and the finite state machine controller, and configured to execute the plurality of second computer readable instructions to make the server-end host execute:

generating a rough question message having a natural language structure based on the received client behavior state and on-demand conversation setting;

inputting the rough question message to make the plurality of finite state machines to perform parsing and transit states of the plurality of finite state machines, to generate and transmit the precise question message to the artificial intelligence platform;

receiving the answer message corresponding to the precise question message from the artificial intelligence platform, and storing the answer message to an answer list; and automatically filtering out the answer message matching the time message and the filtering parameter from the answer list as the on-demand conversation message generated based on the on-demand conversation setting, and transmitting the on-demand conversation message to the client-end host for output.

2. The active chatbot system with behavioral awareness and on-demand conversation according to claim 1, wherein the server-end host selects at least one of a natural language processing (NLP), a generative model and a template matching to generate the rough question message having the natural language structure.

3. The active chatbot system with behavioral awareness and on-demand conversation according to claim 1, wherein the plurality of finite state machines perform parsing on the rough question message to generate a key word and a syntax structure, and the states of the plurality of finite state machines are transited to determine a question type based on a parsing result, and a pre-defined template or a syntax rule is used to generate the precise question message which is more specific and clearer than the rough question message.

4. The active chatbot system with behavioral awareness and on-demand conversation according to claim 1, wherein the plurality of finite state machines comprise a Mealy-machine finite state machine and a Moore-machine finite state machine.

5. The active chatbot system with behavioral awareness and on-demand conversation according to claim 1, wherein the filtering parameter is configured to set the answer message which is permitted to receive, and the answer message which is rejected to receive, wherein the time message is used as a basis of determining the answer message associated with time.

6. An active chatbot method with behavioral awareness and on-demand conversation, comprising:

connecting a server-end host to an artificial intelligence platform and a client-end host;

continuously sensing at least one of a physiological state, a facial expression and a body movement to generate a client behavior state through a sensor, by the client-end host;

continuously transmitting the client behavior state and on-demand conversation setting to the server-end host, by the client-end host, wherein the on-demand conversation setting comprises a time message and a filtering parameter;

generating a rough question message having a natural language structure based on the received client behavior state and on-demand conversation setting, and inputting the rough question message to a plurality of finite state machines to perform parsing, and transiting states of the plurality of finite state machines to generate a precise question message, by the server-end host;

transmitting the precise question message to the artificial intelligence platform through an application programming interface (API) of the artificial intelligence platform, by the server-end host;

inputting the precise question message to the large language model to generate an answer message, and transmitting the answer message to the server-end host through the application programming interface, by the artificial intelligence platform; and receiving the answer message corresponding to the precise question message from the artificial intelligence platform, and storing the answer message to an answer list, automatically filtering out the answer message matching the time message and the filtering parameter as an on-demand conversation message from the answer list, and transmitting the on-demand conversation message to the client-end host for output, by the server-end host.

7. The active chatbot method with behavioral awareness and on-demand conversation according to claim 6, wherein the server-end host selects at least one of a natural language processing (NLP), a generative model and a template matching to generate the rough question message having the natural language structure.

8. The active chatbot method with behavioral awareness and on-demand conversation according to claim 6, wherein the plurality of finite state machines perform parsing on the rough question message to generate a key word and a syntax structure, and the states of the plurality of finite state machines are transited to determine a question type based on a parsing result, and a pre-defined template or a syntax rule is used to generate the precise question message which is more specific and clearer than the rough question message.

9. The active chatbot method with behavioral awareness and on-demand conversation according to claim 6, wherein the plurality of finite state machines comprise a Mealy-machine finite state machine and a Moore-machine finite state machine.

10. The active chatbot method with behavioral awareness and on-demand conversation according to claim 6, wherein the filtering parameter is configured to set the answer message which is permitted to receive, and the answer message which is rejected to receive, wherein the time message is used as a basis of determining the answer message associated with time.

* * * * *